United States Patent

[11] 3,596,924

| [72] | Inventor | Fred D. Watts<br>1149 S. E. 20th, Oklahoma City, Okla. 73129 |
|---|---|---|
| [21] | Appl. No. | 828,826 |
| [22] | Filed | May 29, 1969 |
| [45] | Patented | Aug. 3, 1971 |

[54] VEHICLE STABILIZER
3 Claims, 9 Drawing Figs.

[52] U.S. Cl. .................................................. 280/150 D
[51] Int. Cl. ...................................................... B62d 37/04
[50] Field of Search ........................................... 280/150 C,
150 D, 150 E; 188/1 B, 90, 103, 100

[56] References Cited
UNITED STATES PATENTS

| 2,545,578 | 3/1951 | Hanel | 280/150 D |
| 2,633,368 | 3/1953 | Ross | 280/150 D |
| 2,635,898 | 4/1953 | Silverman | 280/150 D |
| 2,797,931 | 7/1957 | Hans | 280/150 D |

FOREIGN PATENTS

| 1,000,358 | 10/1951 | France | 280/150 D |
| 704,523 | 2/1954 | Great Britain | 280/150 D |
| 470,442 | 4/1952 | Italy | 280/150 D |

*Primary Examiner*—Benjamin Hersh
*Assistant Examiner*—Leslie J. Paperner
*Attorney*—Phillip A. Rein ABSTRACT: This invention is a vehicle stabilizer to be placed in the rear area of a vehicle operable on turning movement and/or stopping of the vehicle to move a weighted object to achieve greater wheel traction with the supporting surface. More particularly, this invention relates to the vehicle stabilizer including an actuator member mounted within oil in a housing means having the actuator member movable axially and rotatably about its axis to provide increased traction and prevent skidding of a vehicle during turning operations.

Patented Aug. 3, 1971 3,596,924
2 Sheets-Sheet 1
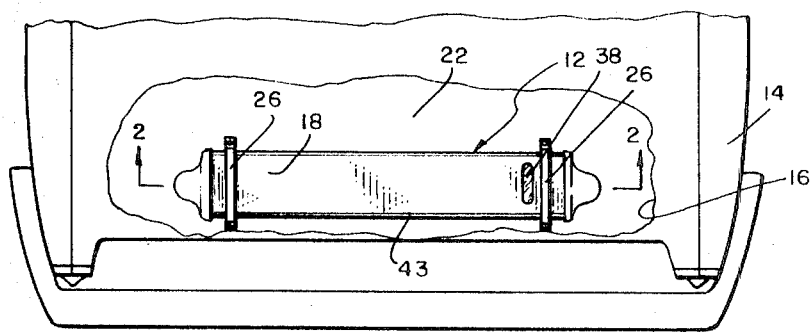
FIG. 1
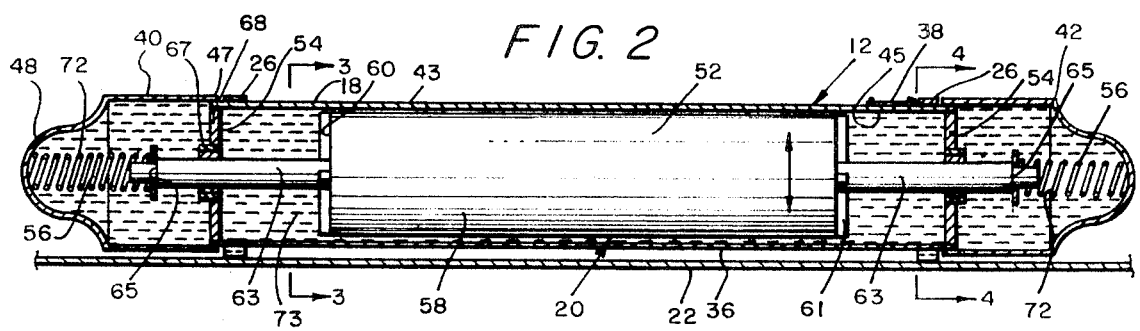
FIG. 2
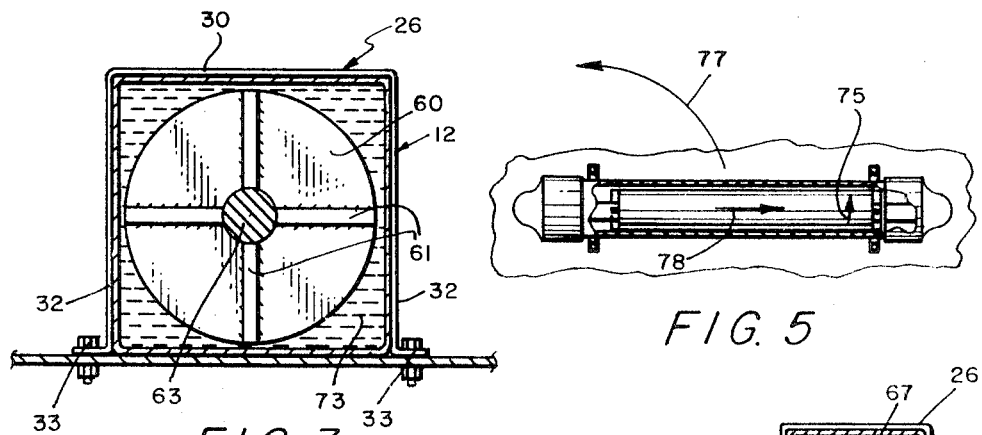
FIG. 3
FIG. 5
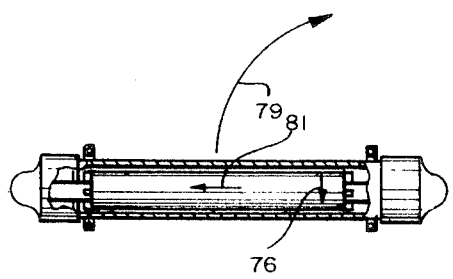
FIG. 6
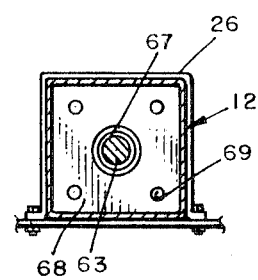
FIG. 4
INVENTOR.
FRED D. WATTS
BY
ATTORNEY Patented Aug. 3, 1971
3,596,924
2 Sheets-Sheet 2
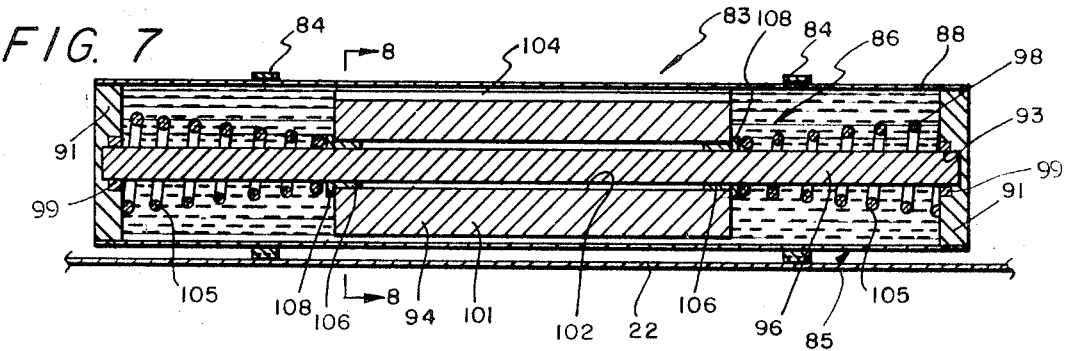
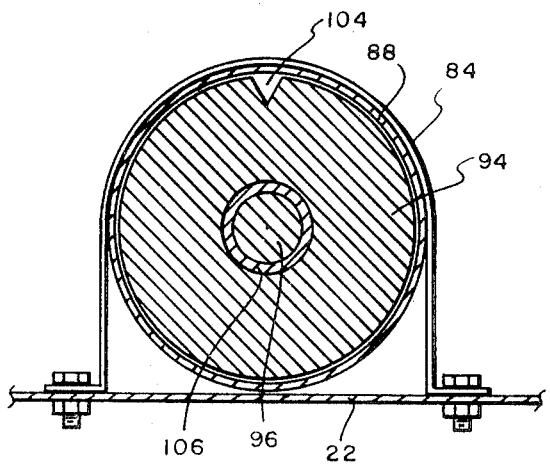
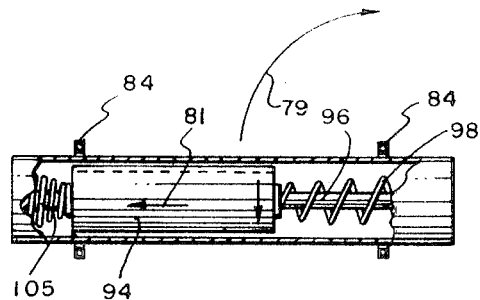
INVENTOR.
FRED D. WATTS
BY
ATTORNEY

VEHICLE STABILIZER

It is noted in the prior art that the trend in vehicles has resulted in a substantial increase in power output with resultant increased speeds but the safety facilities to compensate for this increased speed have not been sufficient. It is noted that the large horsepower of modern vehicles results in the hazard of centrifugal skidding when going about a curved surface or on icy slick pavement. Although the prior art structures have attempted to provide some safety features in regards to shock absorbers, larger springs, and the like, little if any has been done relative to the problem of preventing automotive skidding whether centrifugal or otherwise. It is noted in the prior art that persons have added weights such as sand bags to a rearward portion of a vehicle but this has not solved the problem.

In one preferred embodiment of this invention, a vehicle stabilizer is provided having a housing means mountable within the rear portion of a vehicle having an actuator means mounted therein movable in a fluid. More particular, the housing means is of a generally rectangular shape in transverse cross section having a main housing with end caps secured to opposite ends thereof. The housing is anchored to a given support surface by clamp means. Additionally, the housing is provided with an access plate to visually indicate the level of fluid therewithin and can be used to add fluid thereto if ever required. The actuator means includes a main actuator member mounted within bearing means for rotational and axial movement and having biasing means engageable with the end caps and the actuator member. The actuator member is of a roller pin style provided with a main cylindrical body having laterally extending support and guide shafts at opposite ends. The end surfaces of the main cylindrical body are provided laterally extended fin members. The support and guide shafts are mountable within the respective portions of the bearing means for axial movement therewithin and having a stepped portion adapted to receive the biasing means thereagainst. The biasing means includes a pair of compression spring members, each adapted to be mountable about respective ones of the support and guide shafts against the stepped portion and engageable with the respective end caps so as to bias the actuator member inwardly to a central neutral position.

One object of this invention is to provide a vehicle stabilizer overcoming the aforementioned disadvantages of the prior art devices.

Still, another object of this invention is to provide a vehicle stabilizer readily mountable adjacent the rear axis of a vehicle having an actuator means therein movable axially and rotatable in response to sudden movement of the vehicle to add greater traction to the rear wheels and prevent undesirable vehicle skidding.

Still, one further object of this invention is to provide a vehicle stabilizer having an actuator means mountable within a fluid in a housing means, the actuator means provided with laterally extended fin members and movable axially and rotatably to achieve the desired forces against the rear wheels of the vehicle to increase the traction and stability.

Still, one further object of this invention is to provide a vehicle stabilizer which is simple to install, relatively economical to manufacture, reliable in operation, automatic in operation, and substantially maintenance free.

Various other objects, advantages, and features of the invention will become apparent to those skilled in the art from the following discussion, taken in conjunction with the accompanying drawings, in which:

FIG. 1 is a fragmentary top plan view of an automobile vehicle having a portion of the trunk area broken away to reveal the vehicle stabilizer of this invention;

FIG. 2 is an enlarged sectional view of the vehicle stabilizer of this invention;

FIG. 3 is an enlarged sectional view taken along line 3-3 in FIG. 2;

FIG. 4 is a sectional view taken along line 4-4 in FIG. 2;

FIGS. 5 and 6 are schematic diagrams illustrating the use and operation of the vehicle stabilizer of this invention;

FIG. 7 is a sectional view similar to FIG. 2 of a second embodiment of the stabilizer of the invention;

FIG. 8 is a sectional view along line 8-8 in FIG. 7; and

FIG. 9 is a schematic diagram illustrating the operation of the second embodiment of this invention.

The following is a discussion and description of preferred specific embodiments of the new vehicle stabilizer of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a vehicle stabilizer, indicated generally at 12, is shown mounted in the rear area of an automobile 14. More particularly, it is seen that the vehicle stabilizer is preferably mountable in a trunk section 16 and extended perpendicular to the longitudinal axis of the vehicle 14. It is obvious that the vehicle stabilizer 12 can be moved about and placed in any desired location in the rearward portion of a vehicle but the rearmost area and centrally positioned is desirable. It is also obvious that the vehicle stabilizer could be anchored to the bottom surface of the trunk section 16 so as to be positioned underneath the vehicle 14.

The vehicle stabilizer 12 includes a main housing means 18 having an actuator means 20 therein and the housing means 18 is secured to a support surface 22 through the use of clamp means 26. The clamp means 26 are U-shaped clamp members 28, each having a midsection 30 and parallel L-shaped leg sections 32 attachable to the support surface 22 through bolt members 33. It is seen that two clamp members 28 are used in this embodiment but more may be used as required depending on where and how the vehicle stabilizer 12 is to be anchored to a given vehicle.

The housing means 18 includes a housing member 36 having an access plate member 38 secured thereto and provided at opposite ends with cap members 40 and 42. The housing member 36 is preferably constructed of a square tubular material having an upper wall 43 provided with an opening 45 therein. The access plate member 38 can be constructed of a transparent material having a gasket thereabout so as to achieve a fluid seal over the access opening 45. It is obvious that the access plate member 38 thereupon provides a ready visual observation of the operation of the vehicle stabilizer 12 plus showing the level of the fluid therein. Also, the access plate member 38 can be removed to add fluid to the housing member 36 if required. The end cap members 40 and 42 are each provided with a body section 47 and an integral outer, inwardly tapered head portion 48. The head portion 48 is of a size to permit movement of the actuator means 20 therein as will become obvious.

The actuator means 20 includes an actuator member 52 which is mounted within bearing means 54 and having biasing means 56 engageable with the actuator member 52 to control movement thereof as will be explained. The actuator member 52 is provided with a cylindrical body section 58 having end walls 60 provided with laterally extended fin members 61 and centrally positioned support and guide shafts 63. The cylindrical body section 58 is a solid, heavy structure to provide the necessary stabilizing function. It is obvious that the diameter and length of the cylindrical body section 58 can be varied to provide the required stabilizing function as will become obvious. The end walls 60 are provided with the fin members 61 and, in this embodiment, preferably four such fin members 61 are provided being equally spaced from each other. The fin members 61 are operable to engage the fluid within the housing means 18 for a dampening effect during operation. The support and guide shafts 63 are each provided with an outer support stepped section 65 adapted to receive the biasing means 56 thereagainst.

The bearing means 54 includes a pair of bearing members 67, each secured to a rectangular mounting plate 68, The rectangular mounting plates 68 are secured to the inner surface of the rectangular housing member 36 as by welding or the like and placed in a predetermined position permitting the required axial movement of the actuator member 52 as will be explained. It is seen that the mounting plates 68 may be provided with spaced holes 69 to permit free movement of the fluid within the housing means 18. Also, it is seen that the bearing members 67 are operable to receive the respective support and guide shafts 63 therein in a snug relationship to permit both rotational and axial movement.

The biasing means 56 includes a pair of compression spring members 72, each having one end mounted about and against respective ones of the stepped sections 65 of the support and guide shaft 63 and the opposite ends against the inner surface of the end cap members 40 and 42, respectively. It is noted that the compression spring members 72 are operable to continuously bias the actuator member 52 inwardly to the neutral position. It is noted that the biasing means 56 is thereupon necessary to place the actuator member 52 in the central position so as to be movable in either direction in response to the forces acting thereon.

In the use and operation of the vehicle stabilizer 12 of this invention, it is obvious that same is mounted in the rear portion of the vehicle 14 as shown in FIG. 1. The clamp means 26 is readily connectable to the support surface 22 through the bolt members 33 and having the access plate member 38 in the upward position for ease of observance. The actuator member 52 is mounted within the housing means 18 with fluid, such as oil indicated at 73, completely surrounding the same. As shown in FIG. 2, the neutral or inactive position when the vehicle 14 is not moving positions the actuator member 52 centrally due to the biasing means 56 acting thereon. On moving the vehicle 14 in a straight line, it is obvious that little if any action will take place on the automobile stabilizer 12. However, on applying the brakes without turning the vehicle 14 it is obvious that the actuator member 52 will by its own inertia and motion attempt to continue its forward movement and rotate in a forward manner as shown by the arrow 75. On acceleration of the vehicle 12, the actuator 52 would rotate in the opposite direction as indicated by an arrow 76. This applies additional traction to the rear wheels of the vehicle 14.

As shown in FIG. 5, on turning of the vehicle 14 to the left as indicated by the arrow 77, it is obvious that the centrifugal force will move the actuator member 52 to the right, as indicated by the arrow 78, against the force of right hand compression spring member 72. This operates to provide additional weight and traction to the rear right wheel of the vehicle 14 to assure safety from skidding and the like.

On turning to the right as shown in FIG. 6 and indicated by an arrow 79, it is obvious that the weight of the actuator member 52 and centrifugal force causes the same to move to the left as indicated by an arrow 81 and provide additional weight and traction to the outside wheel thereof. Also, it is noted that decreasing or increasing the vehicle speed can concurrently cause movement of the actuator member 52 in an axial direction plus rotational movement to provide the combination of forces desirable in controlling the skidding movement of the automotive vehicle 14. It is seen that the actuator member 52 under the force of gravity does not remain stationary but moves with the slightest sideway movement of the rear end of the vehicle 14 to provide the desired forces for stability. Also, the action of the compression spring members 72 operate to stabilize the entire apparatus. The vehicle stabilizer 12 functions to automatically apply a counteracting force in the rear end of an automobile vehicle 14 when such shifts to the right or left in skidding.

As shown in FIG. 7, a second vehicle stabilizer 83 is provided connectable to the trunk area of a vehicle as by clamp members 84. The vehicle stabilizer 83 includes a housing means 85 enclosing an actuator means 86.

The housing means 85 includes a cylindrical housing member 88 having opposite open ends closed by cap members 91. The inner surface of each cap member 91 is provided with a bore 93 for reasons to become obvious.

The actuator means 86 includes a piston or actuator member 94 mounted about a shaft member 96 and held in the central or neutral position by a biasing means 98. Opposite ends of the shaft member 96 are inserted in the bores 93 and held in bearing members 99 in the cam members 91. The bearing members 99 provide a safety means to always assure rotation of the shaft member 96 by being free to rotate.

The actuator member 86 includes a main cylindrical body section 101 having a central hole 102 to receive the shift member 96 therethrough. Additionally, the outer periphery of the body section 101 is provided with an oil groove 104 for reasons to become obvious. Opposite ends of the hole 102 are fitted with bearing members 106 to fit snugly over the shaft member 96 while permitting freedom of rotation and axial movement of the body section 101.

The biasing means 98 includes a pair of conical compression spring members 105 acting against opposite ends of the body section 101 and the cap members 91. The inner ends of the spring members 105 are against thrust washers 108 to continually urge the body section 101 to the neutral position.

In the use and operation of the vehicle stabilizer 83 as shown in FIG. 9, it is noted that the same operates substantially identical to the explanation given for the vehicle stabilizer 12 as shown in FIGS. 5 and 6. The main difference is that the actuator member 101 moves axially and rotates on a stationary shaft member 96 aided in smooth operation by the bearing members 106. The oil groove 104 is necessary to permit freedom of oil flow during axial movement of the actuator member 94 to prevent a fluid lock therein. Also, the oil groove 104 removes material from the body section 101 so that the same rests in the same position when not in operation and the resultant unbalance aids in its operation.

Although only two preferred embodiments have been shown on the automobile stabilizer, it is obvious that the same can be provided in various diameters and lengths so as to be usable on the smallest of automobiles through the largest of trucks, only needing a difference in the size, length, and weight thereof. Also, it is obvious that the fluid within the housing means can be oil, automatic transmission fluid, etc.

It is seen that the vehicle stabilizer of this invention provides a compact, neat structure mountable on a given vehicle and providing an economical means achieving opposite reaction forces to prevent skidding of an automobile. The vehicle stabilizer is reliable in operation, simple to mount, economical to manufacture, and substantially maintenance free.

While the invention has been described in conjunction with preferred specific embodiments thereof, it will be understood that this description is intended to illustrate the invention as defined by the following claims.

I claim:

1. A vehicle stabilizer adapted to be mounted in a rear area of a vehicle preferably extended substantially perpendicular to the longitudinal axis thereof, comprising;
   a. a housing means adapted to be secured to a support surface of a vehicle through clamp means,
   b. actuator means having an actuator member mounted within said housing means to provide for axial and rotational movement of said member therein whereby said actuator member moves in opposite directions on turning movement of the vehicle to provide the desired required forces to prevent skidding and aid in traction of the vehicle,
   c. said actuator member mounted on connector means having a pair of spaced bearing members secured to said housing means to receive a portion of said actuator member therewithin to provide for proper alignment and movement during axial and rotational movement of said actuator member, and d. said actuator member having support and guide shafts at opposite ends thereof mounted in said bearing members for controlled movement.

2. A stabilizer as described in claim 1, wherein;

a. said actuator member including a main body section having end walls provided with laterally extended fin members to contact fluid within said housing means to achieve dampened controlled movement of said actuator member.

3. A vehicle stabilizer as described in claim 1, wherein:

a. said housing structure having an access plate to releasably cover said access opening, and said access plate of a transparent material so as to readily indicate status of said actuator means and any oil found therein.